Nov. 3, 1942. M. LIWSCHITZ 2,300,945
ELECTRIC SHIP PROPULSION
Filed Aug. 22, 1941 4 Sheets-Sheet 1

WITNESSES:
Leon M. Garman
Wm. C. Groome

INVENTOR
Michael Liwschitz.
BY
Paul E. Friedemann
ATTORNEY

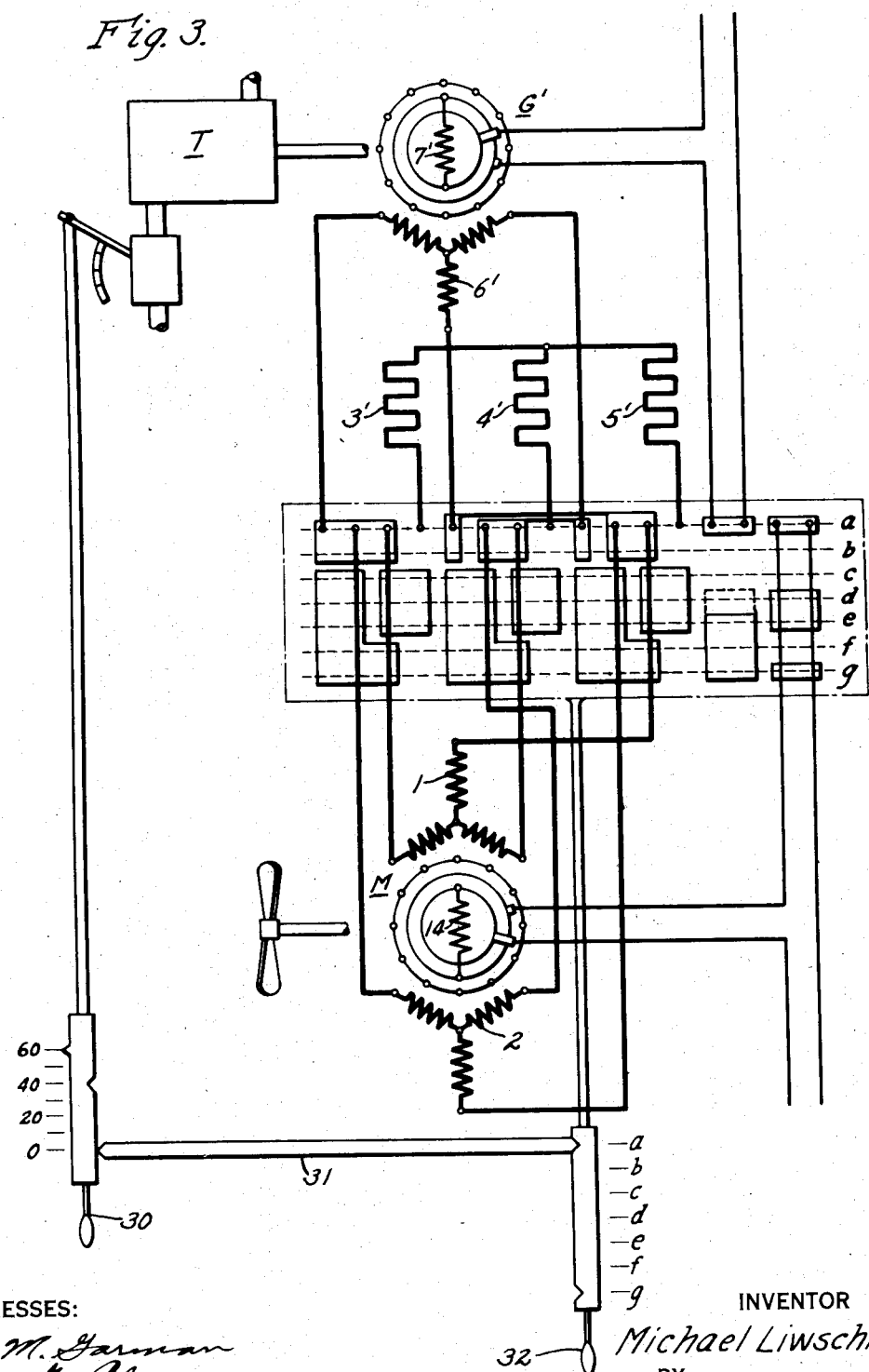

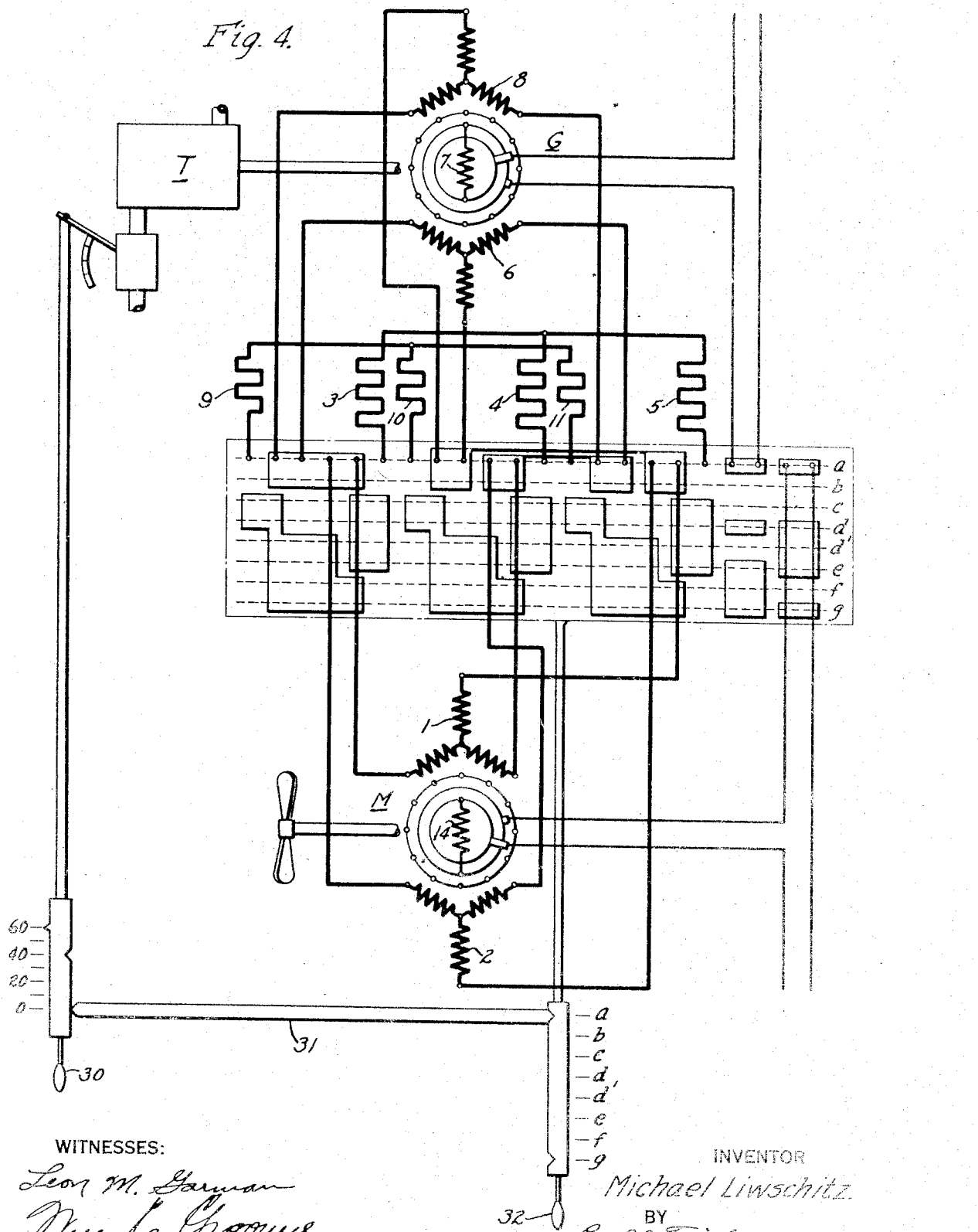

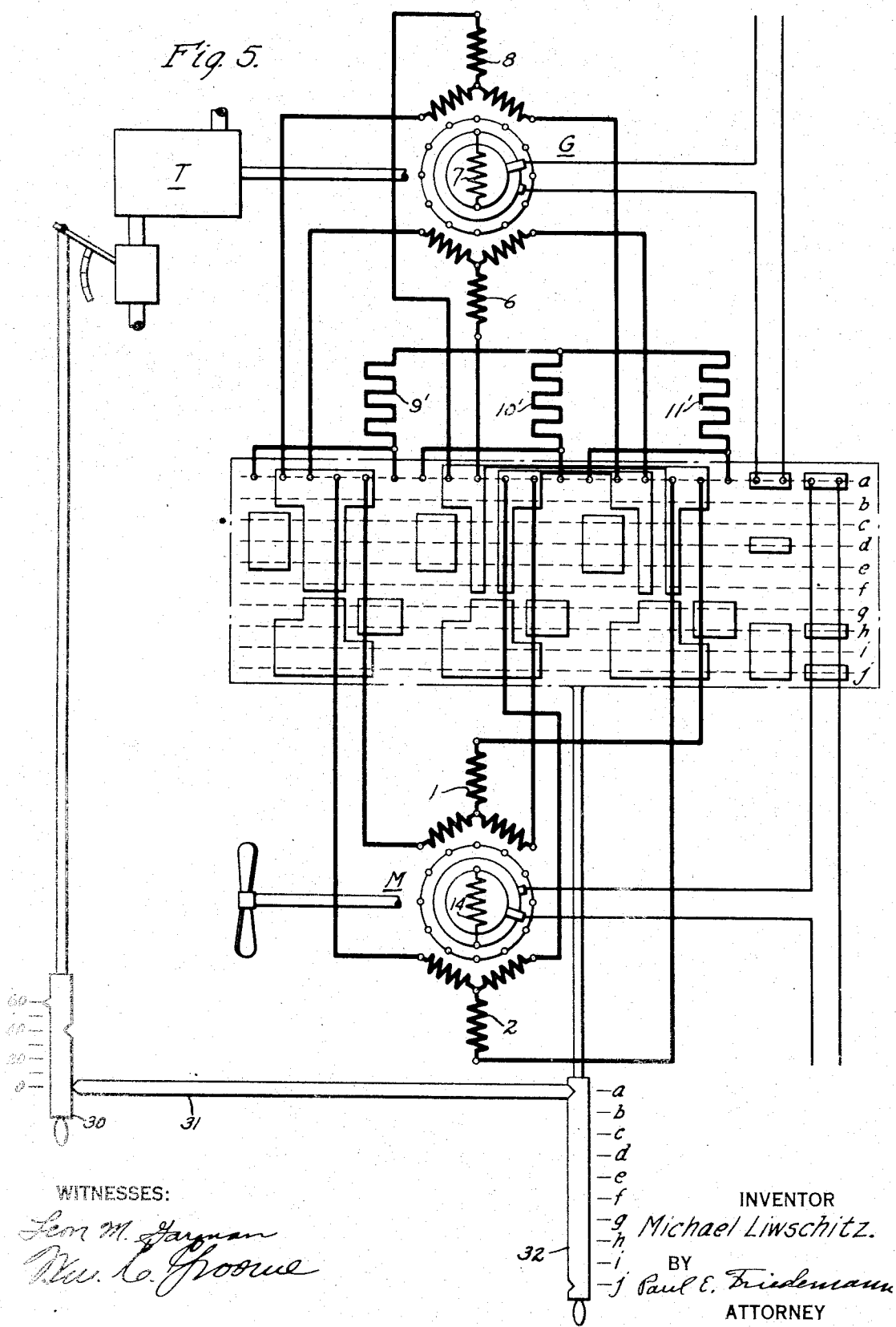

Patented Nov. 3, 1942

2,300,945

UNITED STATES PATENT OFFICE 2,300,945

ELECTRIC SHIP PROPULSION

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,935

9 Claims. (Cl. 172—8)

My invention relates to electric propulsion equipment, and more particularly, to electric ship propulsion equipment utilizing synchronous motors designed to operate also as induction motors for operating a propeller of a ship.

When a synchronous motor is used to drive a propeller, or similar load, there are several methods that may be used for effecting a reversal of the ship. By one method, the synchronous motor, after the reversing connections have been made, is first excited and operated by the propeller as a synchronous generator, and then, second, the connections are so changed that the generator is excited, thus operating the synchronous motor as an induction motor, and third, the motor is synchronized at the proper speed, and, fourth, by changing the speed of the generator the propeller is brought to the desired speed in the reverse direction.

During the time the motor operates as a synchronous generator, the propeller is broken away from the water and brought to a comparatively low speed. One effective way of decreasing the propeller speed in the manner suggested, to avoid high heat development in the damper windings while reversing, is to use dynamic braking, that is, to use a resistance load for the motor. This dynamic braking can be used in a great part of the reversing process. The second step of the reversing process, as briefly explained above, is accomplished by exciting the generator, removing the excitation from the motor, disconnecting the resistors from the motor, and connecting the generator to the motor for reverse operation of the motor, the motor at this time operating as an induction motor.

The group of changes in circuit connections that have to be made to effect the second step takes time and it thus can happen that the motor loses its torque and the ship brings the propeller again to the full no-load speed.

One object of my invention is the provision of preventing the loss of reversing torque during any portion of a reversing cycle for a synchronous motor.

A further object of my invention is the provision of a relatively smooth and uninterrupted reversing torque on a ship propeller during the reversing process of a ship.

Other objects and advantages will become readily apparent from a study of the following specification when taken in conjunction with the accompanying drawings, in which:

Fig. 3 is a diagrammatic showing of my invention in one of its semi-automatic arrangements;

Fig. 4 is a diagrammatic showing of an automatic arrangement of the showing in Fig. 1; and Fig. 5 is a modification of my invention shown diagrammatically.

With my invention, it is possible to avoid the increase in speed of the propeller while changing from dynamic braking to asynchronous operation of the motor M. For this purpose, I use two, or more, parallel circuits, as 1 and 2, for the stator winding of the motor. While one part of the motor stator winding, as 1, is connected with the braking resistors 3, 4 and 5, the other part, as 2, is interconnected with the generator stator winding, as winding 6.

Figure 2:
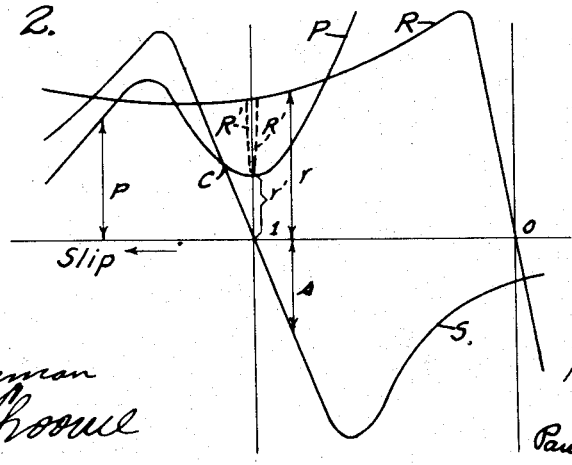
Fig. 2 shows some curves that are helpful in describing the merits of my invention.

When, by dynamic braking, the propeller has been brought down to a low speed, as represented by point C in Fig. 2, the field 7 of generator G is excited. The motor M consequently produces further braking torque through the generator. It is now possible to disconnect resistors 3, 4 and 5 and to also connect the stator winding 1 for reverse operation. The motor thus at no time loses its torque.

To support the dynamic braking, the generator may be excited during dynamic braking and stator windings 6 and 2 of generator G and motor M, respectively, be interconnected during the dynamic braking.

Also when it is expedient to reduce the speed of the generator G, a second stator winding, as 8, normally connected in parallel with winding 6 can be used for the generator. Separate braking resistors as 9, 10 and 11 may be used for this winding 8.

Figure 1:
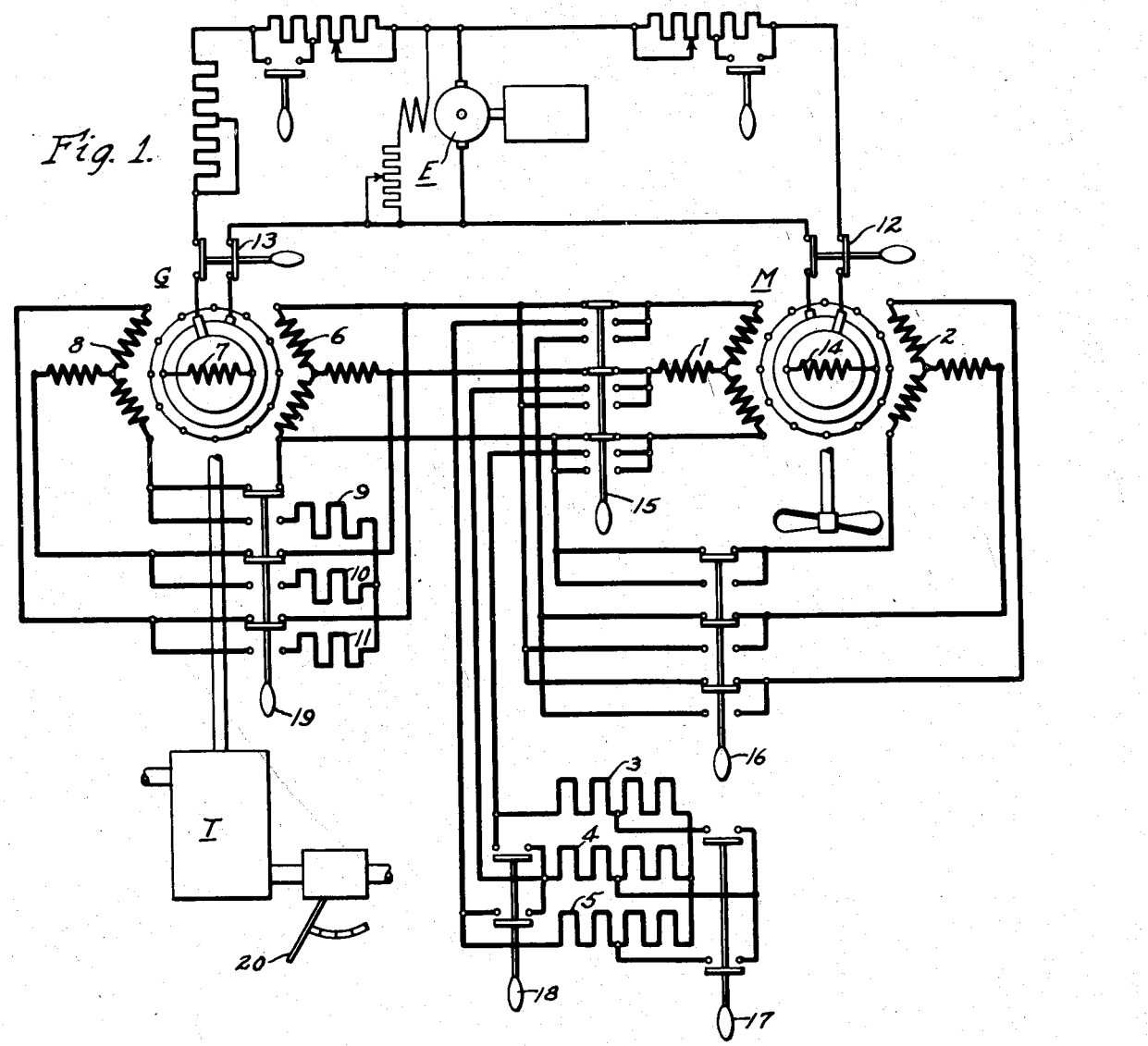
Figure 1 is a diagrammatic showing of a ship propulsion control embodying my invention.

A still better understanding of my invention can probably be had from a study of a typical reversing process for the ship. Assuming that all the connections are as indicated in Fig. 1, then the ship will be operating at full speed in the forward direction. If the command "full-speed astern" is now given the procedure is as follows:

First, the fuel is removed, or decreased, from the prime mover as a turbine or Diesel engine T by suitable operation of fuel lever 20, and the governor is operated to thus decrease the speed of generator G. At the same time, the switches 12 and 13 are opened to remove the excitation from source E, from the motor field 14, and the generator field 7. Reversing switch 15 is now operated to its intermediate position and switch 16 to its lower position. This operation of switch 15 opens the circuit between stator windings 1 and 6 and connects resistors 3, 4 and 5 to stator winding 1. Since switch 16 is closed for reverse operation, stator winding 2 remains connected to stator winding 6, but for reverse operation. Fuel is again supplied to the prime mover to operate the generator G at the sychronizing speed, which may be at about 30% or 33% of its full speed.

Switch 12 is now closed to excite the field winding 14. With the motor excited and the resistors 3, 4 and 5 connected to winding 1, the propeller is broken from the water and is decreased in speed by the motor stator torque to point C, shown in Fig. 2. This decrease in propeller speed may be effected in several steps by suitable resistor shunting switches as 17 and 18.

At point C the stator torque is rapidly decreasing and becomes less than the propeller torque. At point C, or preferably slightly ahead of point C, switch 13 is again closed to excite field winding 7. A motor rotor torque from winding 2 now also becomes effective to aid in further decreasing the propeller speed. Since this motor rotor torque rises at this stage of operation, as shown in Fig. 2, there is no loss of motor torque.

Switch 15 can now be thrown to its lowermost position and switch 12 opened and without danger of loss of torque. When switch 15 is in the lowermost position, stator winding 1 is also connected to generator stator winding 6 and in parallel to motor stator winding 2 and for the same reverse operation that stator 2 is connected. The motor thus reverses the propeller and brings it up to its full balancing speed as an induction motor. At that speed, switch 12 is closed to synchronize motor M and thereafter the generator speed is increased to the desired speed for the reverse operation of the ship.

If it is expedient to rapidly decrease the speed of the generator, the generator may be provided with second stator winding 8 connected in parallel to stator winding 6. Under these conditions, the fuel is first reduced and the governor operated on the prime mover driving generator G to operate it at, say 30%, or 33%, of full speed, or some other speed, second, field switches 12 and 13 are opened, third, switches 15, 16 and 19 are operated—switch 15 is moved to its intermediate position, switch 19 to its lowermost position, and switch 16 to its intermediate position or its lowermost position, fourth, switches 12 and 13 are closed. These operations cause simultaneous braking of the motor and generator since both machines are independently and simultaneously subject to dynamic braking. The generator is dynamically braked by resistors 9, 10 and 11 connected to stator winding 8. The motor is dynamically braked by resistors 3, 4 and 5 only, if switch 16 is in its intermediate position, or dynamically braked by both the resistors 3, 4 and 5 and stator winding 6, if switch 16 is in its lowermost position.

When simultaneous braking is not essential, the arrangement and sequence of operation of the essential switches may be such that only one group of dynamic braking resistors may be used, as resistors 3, 4 and 5.

As soon as the generator is down to its selected lower speed, switch 13 is opened, switch 19 is moved to the position shown, and switch 16 is moved to its lowermost position, if not already in this position. Close switch 12.

At this point, switch 13 may again be closed to thus get the benefit of a rotor torque from the motor since stator winding 2 will at this stage be connected to both stator windings 6 and 8. It might be preferable at this stage, if there is no danger of resonance, to close switch 13. Otherwise switch 13 should not be closed until just prior to or at point C. The remaining steps will be just as hereinbefore described.

In the showing in Fig. 3, assuming the connections as shown are for full speed ahead, when the command "full-speed astern" is given, the operation is as follows:

The attendant moves the speed lever 30 to the position of 33% of full speed. This will be at the twenty-cycle position. The interlock 31 thus releases the reversing lever 32 and this lever is immediately moved, at substantially uniform speed, from the $a$ position through the $b$ and $c$ positions to the $d$ position. In the $b$ position both the generator G' and the motor M will be unexcited, in the $c$ position armature winding 1 will be disconnected from the armature winding 6' and will be connected to resistors 3', 4' and 5', armature winding 2 will have its connections to armature winding 6' reversed, and in the $d$ position the motor field 14 is connected to be excited.

The motor now operates a synchronous generator braking the propeller by dynamic braking. This braking is continued, by holding lever 32 in the $d$ position, until the propeller speed is nearly at position $c$, at which time the lever 32 is moved to the $e$ position. In the $e$ position, the generator field 7' is excited and windings 2 and 6' will aid in the braking. This braking could, if desired, be started in position $d$ in which case the controller segment controlling field 7' could be constructed as shown by the dotted lines.

Since the rotor torque of winding 2 is now added to the stator torque, the braking of the propeller continues (see Fig. 2) even though the motor is unexcited. In the $f$ position, to which lever 32 is now moved while the propeller is near standstill, the resistors 3', 4' and 5' are disconnected and the connection of winding 1 to winding 6' is reversed.

At full induction motor speed for the then existing speed setting lever 32 is moved to the $g$ position to synchronize the motor M. By this operation, the speed lever is released and this lever is now moved to the speed desired.

The showing in Fig. 4 corresponds to the showing in Fig. 1, except that my invention is shown in its more complete aspects. The sequence of operation is substantially like that described in connection with Fig. 1. I have used the same reference characters in this Fig. 4. It is thought that a mere study of this figure, once Figs. 1 and 3 and the description given with them are understood, will suffice to understand its sequence of operation.

The showing in Fig. 5 utilizes but one set of resistors for both the generator and the motor. When this arrangement is used simultaneous braking of the generator and the motor is not possible, but this causes substantially no delay or at least no great delay in decreasing the propeller speed.

With this modification, the sequence of operation, for a reversing process, is as follows:

The speed lever 30 is first moved to the 33% speed position and then lever 32, being released by interlock 31, is moved from the $a$ position through the positions $b$ and $c$ to the $d$ position. In the $b$ position, both fields 7 and 14 are deenergized, in the $c$ position resistors 9' and 10' and 11' are connected to winding 8 and in the $d$ position the field 7 is again excited. The generator G and thus the Diesel engine connected to it are rapidly braked down to the 33% speed.

When the generator is at the lower speed position, lever 32 is moved from the $d$ position through positions $e$, $f$, $g$, to the $l$ position. In position the generator field 7 is unexcited. In position $+$ the resistors 9', 10' and 11' are disconnected from the generator. In the $g$ positions the resistors 9', 10' and 11' are connected to the motor windings 1 and the motor windings 2 are connected to windings 6 for reverse operation. In position $h$, both field windings 7 and 14 are energized.

The motor thus brakes the propeller by dynamic braking of its stator torque and also by a rotor torque of the winding 2.

At or near propeller standstill lever 32 is moved to the $i$ position to thus deenergize field 14. The motor now accelerates in reverse direction as an induction motor. At the proper synchronizing speed lever 32 is moved to the $j$ position exciting field 14. Speed lever 30 is now moved to any desired speed.

My invention is not limited to the particular modifications shown but is only to be limited to the claims.

I claim as my invention:

1. In an electric ship propulsion system utilizing a synchronous propeller driving motor designed to be also operable as an induction motor, in combination, an alternator; a synchronous motor; means for dynamically braking said motor by a stator torque, during a reversing process, to decrease the propeller speed to a predetermined relatively low speed less than standstill; means for also adding a rotor torque to the stator torque to further decrease the propeller speed; means for fully reversing the connections of the motor to the alternator while said rotor torque is braking the propeller to thus brake the propeller to standstill and accelerate it in the reverse direction on the motor rotor torque.

2. In an electric ship propulsion system utilizing a synchronous propeller driving motor designed to be also operable as an induction motor, in combination, an alternator; a synchronous motor; said synchronous motor having two normally parallelly connected armature windings, means for reversing the connections of one armature winding to the alternator, means for dynamically braking the speed of the motor and thus the propeller by the use of the other motor armature winding while the motor is excited, means for exciting the generator while the motor is still subject to the dynamic braking effect to also brake the motor speed by the motor armature winding whose connections have been reversed, means for discontinuing the dynamic braking and reversing the connections of the other motor armature winding while the braking effect of the motor by reason of the reversed armature connections continues, whereby said motor is reversed without loss of torque at any time.

3. In an electric ship propulsion system utilizing a synchronous propeller driving motor designed to be also operable as an induction motor, in combination, a prime mover; means for varying the speed of the prime mover; an alternator coupled to the prime mover, said alternator having a stator winding, a second stator winding, and a field winding; a synchronous motor, said motor having a stator winding, a second stator winding, and a field winding; a dynamic braking resistor; a second dynamic braking resistor; means for exciting the motor and generator field windings; means for overexciting the motor and generator field windings, means for connecting one dynamic braking resistor to one of the motor stator windings; means for connecting the other dynamic braking resistor to one of the generator stator windings; means for reversing the connection between certain of the stator windings of the motor and alternator; and means for reversing the connection between the remaining stator windings of the motor and alternator.

4. In an electric ship propulsion system utilizing a synchronous propeller driving motor, in combination, an alternator; a synchronous motor having two armature windings and being designed to also operate as an induction motor; a ship propeller coupled to the motor to be driven thereby; means connected to one of the motor armature windings, during a reversing process for effecting a reversal of the ship propeller, for dynamically braking the motor by a stator torque to decrease the speed of the propeller to a given speed; means for reversing the connection of the other armature winding to the alternator to thus also produce a braking rotor torque on the propeller; means for reversing the connection of the other motor armature winding to the alternator while rotor torque of the said one motor armature winding continues to thus brake the propeller to standstill and to accelerate it in the reverse direction on the motor rotor torques of both armature windings to near the speed of the alternator.

5. In an electric ship propulsion system utilizing a synchronous propeller driving motor, in combination, an alternator; a synchronous motor having two armature windings and being designed to also operate as an induction motor; a ship propeller coupled to the motor to be driven thereby; means connected to one of the motor armature windings, during a reversing process for effecting a reversal of the ship propeller for dynamically braking the motor by a stator torque to decrease the speed of the propeller to a given speed; means for reversing the connection of the other armature winding to the alternator to thus also produce a braking rotor torque on the propeller; means for stopping the dynamic braking and for reversing the connection of the other motor armature winding to the alternator while rotor torque of the said one motor armature winding continues to thus brake the propeller to standstill and to accelerate it in the reverse direction on the motor rotor torques of both armature windings to near the speed of the alternator.

6. In an electric ship propulsion system utilizing a synchronous propeller driving motor, in combination, an alternator; a synchronous motor having two armature windings and being designed to also operate as an induction motor; a ship propeller coupled to the motor to be driven thereby; means connected to one of the motor armature windings, during a reversing process for effecting a reversal of the ship propeller, for dynamically braking the motor by a stator torque to decrease the speed of the propeller to a given speed; means for reversing the connection of the other armature winding to the alternator to thus also produce a braking rotor torque on the propeller; means for reversing the connection of the other motor armature winding to the alternator while rotor torque of the said one motor armature winding continues to thus brake the propeller to standstill and to accelerate it in the reverse direction on the motor rotor torques of both armature windings to near the speed of the alternator; means for synchronizing the motor.

7. In an electric ship propulsion system utilizing a synchronous propeller driving motor, in combination, an alternator; a synchronous motor having two armature windings and being designed to also operate as an induction motor; a ship propeller coupled to the motor to be driven thereby; means connected to one of the motor armature windings, during a reversing process for effecting a reversal of the ship propeller, for dynamically braking the motor by a stator torque to decrease the speed of the propeller to a given speed; means for reversing the connection of the other armature winding to the alternator to thus also produce a braking rotor torque on the propeller; means for reversing the connection of the other motor armature winding to the alternator while rotor torque of the said one motor armature winding continues to thus brake the propeller to standstill and to accelerate it in the reverse direction on the motor rotor torques of both armature windings to near the speed of the alternator, and means for controlling the speed and thus the frequency of the alternator.

8. In an electric ship propulsion system utilizing a synchronous propeller driving motor, in combination, an alternator; a synchronous motor having two armature windings and being designed to also operate as an induction motor; a ship propeller coupled to the motor to be driven thereby; means connected to one of the motor armature windings, during a reversing process for effecting a reversal of the ship propeller, for dynamically braking the motor by a stator torque to decrease the speed of the propeller to a given speed; means for reversing the connection of the other armature winding to the alternator to thus also produce a braking rotor torque on the propeller; means for stopping the dynamic braking and for reversing the connection of the other motor armature winding to the alternator while rotor torque of the said one motor armature winding continues to thus brake the propeller to standstill and to accelerate it in the reverse direction on the motor rotor torques of both armature windings to near the speed of the alternator, means for synchronizing the motor, and means for controlling the speed and thus the frequency of the alternator.

9. In an electric ship propulsion system utilizing a synchronous motor, in combination, a prime mover; an alternator, having a field winding and having two armature windings coupled to the prime mover; means for varying the speed of the prime mover to vary the frequency of the current generated by the alternator; a synchronous motor; a ship propeller coupled to the synchronous motor to be driven thereby; said synchronous motor, being designed to operate as an induction motor, is provided with a field winding and two armature windings; means for exciting the field windings of both the motor and the alternator; two dynamic braking means; said means, during reversal of the ship propeller, for varying the speed of the prime mover being operable to decrease the prime mover speed and to remove the excitation from the field windings of both the alternator and the motor; means for reversing the connection of one motor armature winding to one of the armature windings of the alternator; means for connecting one dynamic braking means to the other motor armature winding; means for connecting the other dynamic braking means to the other armature winding of the alternator; means for admitting fuel to the prime mover to operate it at a speed that may fall between one-fourth to one-half of full speed; at the time the excitation is reapplied to the motor and alternator; means operable after the alternator speed and propeller speed are at the desired low value to cease dynamic braking and to reverse the connection of the second motor armature winding while at the same time removing the motor excitation to operate the motor in reverse direction as an induction motor; said means for exciting the motor field being operable at the balancing induction motor speed to synchronize the motor by re-exciting the motor field.

MICHAEL LIWSCHITZ.